United States Patent
Mukhopadhyay et al.

(10) Patent No.: US 9,875,085 B2
(45) Date of Patent: Jan. 23, 2018

(54) MEMORY SYSTEM AND METHOD OF GENERATING A SEED VALUE

(71) Applicant: SanDisk Technologies Inc., Plano, TX (US)

(72) Inventors: Rishi Mukhopadhyay, Bangalore (IN); Abhijeet Manohar, Bangalore (IN); Rajesh Neermarga, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 150 days.

(21) Appl. No.: 14/811,481

(22) Filed: Jul. 28, 2015

(65) Prior Publication Data

US 2017/0031656 A1 Feb. 2, 2017

(51) Int. Cl.
*G06F 7/58* (2006.01)

(52) U.S. Cl.
CPC .............. *G06F 7/588* (2013.01); *G06F 7/584* (2013.01)

(58) Field of Classification Search
None
See application file for complete search history.

(56) References Cited

U.S. PATENT DOCUMENTS

| 7,298,843 | B2 | 11/2007 | Krell et al. |
| 8,843,539 | B2 | 9/2014 | Dey |
| 9,542,157 | B2 * | 1/2017 | Falk ..................... G06F 7/582 |
| 2004/0213407 | A1 | 10/2004 | Fujita et al. |
| 2010/0121896 | A1 | 5/2010 | Oram |
| 2015/0293748 | A1 * | 10/2015 | Falk ..................... G06F 7/582 713/193 |
| 2016/0028544 | A1 * | 1/2016 | Hyde ................... H04L 9/0869 380/44 |
| 2017/0031656 | A1 * | 2/2017 | Mukhopadhyay ...... G06F 7/588 |

FOREIGN PATENT DOCUMENTS

| WO | WO 00/16182 | 3/2000 |
| WO | WO 2007/026287 | 3/2007 |

* cited by examiner

*Primary Examiner* — David H Malzahn
(74) *Attorney, Agent, or Firm* — Brinks Gilson & Lione

(57) ABSTRACT

A memory system and method are provided for generating a seed value. In one embodiment, a memory system identifies a random defect in a memory die and, in accordance with the identified random defect in the memory die, generates a seed value, wherein with the generated seed value a random number can be generated. Other embodiments are provided, which can be used alone or in combination with one another.

31 Claims, 8 Drawing Sheets

MEMORY SYSTEM AND METHOD OF GENERATING A SEED VALUE

BACKGROUND

Many memory systems have the ability to generate a random number, which can be used, for example, to establish a secure communications link with another entity to securely transfer data to and/or from the memory system. Because various memory systems often use the same algorithm for generating a random number, in order to reduce the likelihood that memory systems will generate the same random number, memory systems can use different values (known as "seed values") to initialize the random number generator. These seed values are preferably sufficiently unique, so that it is very unlikely that two memory systems will generate the same random number.

There are many techniques a memory system can use to generate a seed value. For example, the memory system can use one or more fast-running counters and sample the counter(s) at a random time or in response to an external event, where the sampled value of the fast-running counter(s) would be used as the seed value for the random number generator. As another example, a seed value can be generated based on dynamic memory blocks with iterative logic. In one implementation of this, the memory system can retrieve a first data block and derive a random address from the first data block, which is used to retrieve a second data block and so on, with the iteration continuing until a sufficiently-randomized seed value is determined. As yet another example, the memory system can generate entropy bits by comparing two values retrieved from any storage locations, like memory cells, registers, or clocks (e.g., comparing the number of bits with value 1 or determining whether is a first read value is greater or lesser than a second read value). The entropy bits can be aggregated on similar multiple comparisons until all the bits of the seed value are generated. As yet another example, the memory system can probe analog signals, such as oscillating frequency circuits or noise levels, having a random analog value at the time the signal is sampled. For stronger non-repeatability, the analog signals can be monitored at multiple instances to generate an array of values, which can then be used to derive a composite seed value based on some mathematical functions or simple logical aggregation. As another example, the memory system can use dedicated sensors to probe physical parameters, such as temperature and light intensity, to generate a seed value.

DETAILED DESCRIPTION

Figure 1:
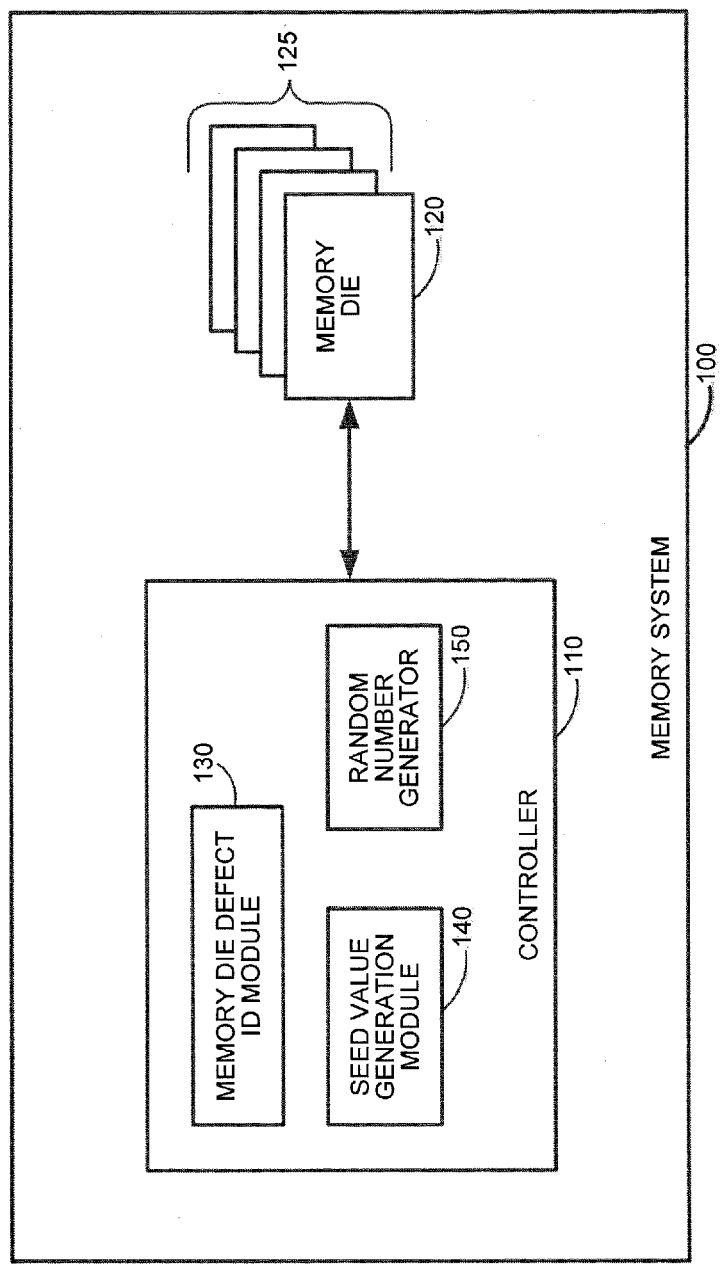
FIG. 1 is a block diagram of an exemplary memory system of an embodiment.

By way of introduction, the below embodiments relate to a memory system and method for generating a seed value. In one embodiment, a method for generating a seed value is provided. In this embodiment, the memory system identifies a random defect in a memory die and, in accordance with the identified random defect in the memory die, generates a seed value, wherein with the generated seed value a random number can be generated.

In another embodiment, a memory system is provided comprising a memory die and a controller configured to identify a random inherent characteristic in the memory die and generate a seed value for generation of a random number based on the identified random inherent characteristic in the memory die.

In another embodiment, a memory system is provided comprising a memory die, a memory die defect identification module configured to identify a defect in the memory die, and a seed value generation module configured to generate a random number based on the identified defect in the memory die.

In some embodiments, the seed value is generated by generating a random string based on the identified defect/characteristic, generating a random seed vector from the random string, and generating the random seed value from the random seed vector.

In some embodiments, the memory die is configured to store information about the defect/characteristic in the memory die, and the defect/characteristic in the memory die is identified by reading the information from the memory die.

In some embodiments, the memory system also generates a random number based on the seed value. The random number can be generated by a hardware random number generator in a controller in the memory system or by the controller executing computer-readable program code.

In some embodiments, after the seed value has been generated, the memory system identifies an additional defect/characteristic in the memory die and generates a new seed value based the identified additional defect/characteristic in the memory die.

In some embodiments, the memory system further comprises at least one additional memory die and identifies a defect/characteristic in the at least one additional memory die and generates the seed value based on the identified defect/characteristic in the memory die and the at least one additional memory die.

In some embodiments, the defect/characteristic is identified by one or more of the following: a bad block list, a bad bit location, a partial bad block list, a partial good block list, a grown bad block list, and a list of defective wordlines.

In some embodiments, the memory die is a three-dimensional memory.

In some embodiments, the memory system is embedded in a host or is removably connected to a host.

In some embodiments, a random seed is generated over a life time of the memory system based on a random string comprising an initial defect in the memory system, a new added random defect, and a random parameter. In some embodiments, the added random defect comprises one or more of the following: a grown bad block, a grown partial bad block, and a grown partial good block. In some embodiments, the random parameter comprises one or more of the following: a read scrub queue entry, an LFSR state, and a trimming parameter.

Other embodiments are possible, and each of the embodiments can be used alone or together in combination.

As mentioned above, these embodiments generally relate to a memory system and method for generating a seed value. Before turning to several examples, the follow paragraphs present an exemplary memory system 100 that can be used with these embodiments.

Turning now to the drawings, FIG. 1 is a block diagram of a memory system 100 of an embodiment. As shown in FIG. 1, the memory system 100 of this embodiment comprises a controller 110 in communication with a memory die 120. As used herein, the phrase "in communication with" could mean directly in communication with or indirectly in communication with through one or more components, which may or may not be shown or described herein. The controller 110 can communicate with the memory die 120 using any suitable interface, such as, for example, a flash interface (e.g., Toggle Mode 200, 400, or 800). In general, the controller 110 transmits command sequences for read, program, and erase operations to the memory die 120, as well as performs other functions, as will be discussed below.

In some embodiments, the memory system 100 comprises a single memory die 120, while, in other embodiments, the memory system 100 comprises at least one additional memory die 125. As used herein, the term "die" refers to the collection of non-volatile memory cells, and associated circuitry for managing the physical operation of those non-volatile memory cells, that are formed on a single semiconductor substrate. A memory die may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

As shown in FIG. 1, the controller 110 comprises a memory die defect identification module 130 configured to identify a defect in the memory die 120 and a seed value generation module 140 configured to generate a seed value based on the identified defect in the memory die 120. As used herein, a "module" may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

The memory die defect identification module 130 is configured to identify a defect in the memory die 120. In one embodiment, random defects are detected during testing of the memory die 120 and information about the detected random defect is stored in the memory die 120. That way, the memory die defect identification module 130 can identify the random defect in the memory die 120 by simply reading the stored information. For example, the stored information can indicate one or more of the following: a bad block list, a bad bit location, a partial bad block list, a partial good block list, a grown bad block list ("grown" meaning that the defect developed over time), and a list of defective wordlines (e.g., offset locations in a block). Instead of reading stored information about previous-detected defects, the memory die defect identification module 130 can be configured with a self-test feature to determine defects after the manufacturing of the memory die 120 (e.g., in the field). For example, the memory die defect identification module 130 can program a set of memory cells in the memory with known data, then read back the stored data to see if it matches (e.g., within a margin of error) the known data. If it does not, the memory die defect identification module 130 can identify that set of memory cells as having a defect.

The seed value generation module 140 is configured to generate a seed value number based on the identified defect in the memory die 120. For example, the seed value generation module 140 can be programmed to generate a random string based on the identified random defect, generate a random seed vector from the random string, and generate the random seed value from the random seed vector. One suitable routine that the seed value generation module 140 can be programmed with is shown in FIG. 4-7 and described below.

In this embodiment, the controller 100 also comprises a random number generator 150 configured to generate a random number based on the seed value. The random number generator 150 can be a hardware random number generator. In general, a hardware random number generator is an apparatus that generates random numbers from a physical process, such as, but not limited to, statistically-random noise signals (e.g., thermal noise), the photoelectric effect, and other quantum phenomena. A hardware random number generator can comprise, for example, a transducer to convert some aspect of the physical phenomena to an electrical signal, an amplifier to increase the amplitude of the random fluctuations to a measurable level, and an analog-to-digital converter to convert the output into a digital number. By repeatedly sampling the randomly varying signal, a series of random numbers is obtained. In one embodiment, the random number generator 150 takes the form of a linear-feedback shift register (LFSR).

The random number generator 150 can also be a software random number generator that is implemented by a processor in the controller executing computer-readable program code (stored in the controller 110 or in the memory die 120, for example). For example, the controller 110 can have functions or library routines that provide random number generators that use the controller's clock as a seed.

The controller 110 can contain other components as well, such as, but not limited to, random access memory (RAM), read only memory (ROM) (e.g., to store system boot code), an error correction controller (ECC) engine to encode/decode data written to and read from the memory die 120, and a crypto-engine to provide encryption and/or decryption operations.

The controller 110 can be implemented in any suitable manner. For example, the controller 110 can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 110 can be configured with hardware and/or firmware to perform the various functions described below and shown in the flow diagrams. Also, some of the components shown as being internal to the controller 110 can also be stored external to the controller 110, and other components can be used.

The memory system 100 can take any suitable form. For example, the memory system 100 can be a removable mass storage device, such as, but not limited to, a handheld, removable memory device, such as a memory card (e.g., a Secure Digital (SD) card, a micro Secure Digital (micro-SD) card, or a MultiMedia Card (MMC)), or a universal serial bus (USB) device. The memory system 100 can also take the form of an embedded mass storage device, such as an eSD/eMMC embedded flash drive or an embedded or removable solid state drive (SSD) found in, for example, portable computing devices, such as laptop computers, and tablet computers.

Figure 2A:
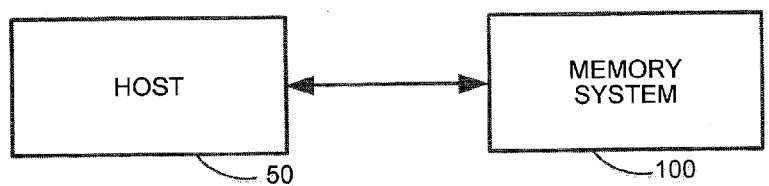
FIG. 2A is a block diagram of a memory system of an embodiment removably connected to a host.
Figure 2B:
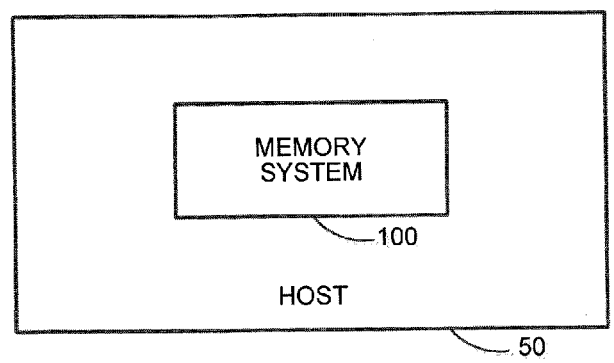
FIG. 2B is a block diagram of a memory system of an embodiment embedded in a host.

As shown in FIG. 2A, in some embodiments, the memory system 100 is removably connected to a host 50 (e.g., where the host 50 and memory system 100 can each have mating physical connectors that allow the memory system 100 to be removably connected to the host 50. The memory system 100 can communicate with the host 50 using an suitable interface. Examples of interfaces include, but are not limited to, SATA, SATA Express, SAS, Fibre Channel, USB, PCIe, and NVMe. In other embodiments (shown in FIG. 2B), the memory system 100 is embedded in a host 50 (FIG. 2B).

A host can also take any suitable form. A host 50 typically has a controller and an interface for communicating with the memory system 100. In some implementations, the host 50 has a crypto-engine operative to provide encryption and/or decryption operations for communication with the memory system 100 (e.g., for mutual authentication, key exchange, and establishment of a secure channel). The host 50 can contain other components (e.g., a display device, a speaker, a headphone jack, a video output connection, etc.). Examples of hosts 50 include, but are not limited to, a mobile phone, a digital media player, a game device, a personal digital assistant (PDA), a personal computer (PC), a kiosk, a set-top box, a TV system, a book reader, or any combination thereof.

Figure 3:
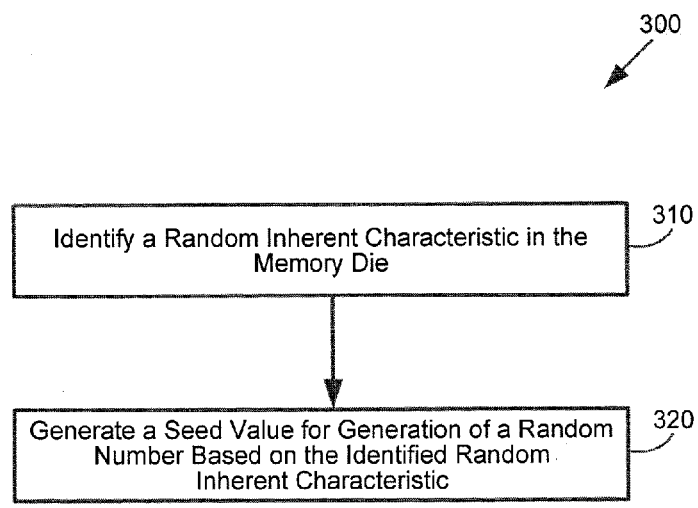
FIG. 3 is a flow chart of a method of an embodiment for generating a seed value.

As mentioned in the background section above, many memory systems have the ability to generate a random number, which can be used, for example, to establish a secure communications link with another entity (e.g., for secure key exchange) to securely transfer data to and/or from the memory system. Because various memory systems often use the same algorithm for generating a random number, in order to reduce the likelihood that memory systems will generate the same random number, memory systems can use different values (known as "seed values") to initialize the random number generator. These seed values are preferably sufficiently unique, so that it is very unlikely that two memory systems will generate the same random number. That is, if unique random seed values are not used, random sequences across many memory systems using the same generating algorithm can produce the same sequence and, thus, can be easily exploited by cryptanalysis Various techniques can be used to reduce the repeatability of seed values across multiple memory systems, and the strength of a strong seed value (i.e., the degree to which there is an extremely low probability of recurrence across memory systems) depends on the inherent randomization of the system on which the seed value is generated. To ensure such randomness, some memory systems require additional hardware, which can increase the cost and complexity of the memory system. In one embodiment, a memory system 100 is presented that can generate a true random number for seeding a random number generating algorithm without the necessity of additional hardware. As shown in the flow chart 300 in FIG. 3, in one embodiment, the memory system 100 identifies a random inherent characteristic in the memory die 120 (act 310) and then generates a seed value for generation of a random number based on the identified random inherent characteristic (act 320). As used herein, a "random inherent characteristic in the memory die" can take any suitable form, such as, but not limited to, a random defect in the memory die 120 or a random parameter used in the memory die 120. Examples of random defects include, but are not limited to, a bad memory cell or a bad group of memory cells (e.g., a bad bit, a bad wordline, or a bad block). Examples of random parameters include, but are not limited to, contents of a read scrub queue (e.g., blocks scheduled for refresh), memory trim parameters (e.g., Vpgm, Vera, master clock frequency, VCGxx, and CELSRC), and a state of a random number generator. For simplicity, in the following paragraphs, the random inherent characteristic in the memory die 120 will take the form of a random defect in the memory die 120. Also, while these examples are discussed in terms of a random inherent characteristic or random defect in the memory die 120, it should be understood that if the memory system 100 comprises at least one additional memory die 125, memory system 100 can identifying the random defects (and generate a seed value based on the identified defects) in the memory die 120 and in one or more of the at least one additional memory die 125.

The random defect in the memory die 120 can be identified in any suitable way. For example, in one embodiment, random defects are detected during testing of the memory die 120 and information about the detected random defect is stored in the memory die 120. That way, the memory system 100 (e.g., the controller 110, the memory die defect identification module 130, or some other component in the memory system 100) can identify the random defect in the memory die 120 by simply reading the stored information. For example, the stored information can indicate one or more of the following: a bad block list, a bad bit location, a partial bad block list, a partial good block list, a grown bad block list ("grown" meaning that the defect developed over time), and a list of defective wordlines (e.g., offset locations in a block). Of course, these are just examples, and other parameters can be used. Alternatively, instead of reading stored information about previous-detected defects, the memory system 100 can be configured with a self-test feature to determine defects after the manufacturing of the memory die 120 (e.g., in the field). As will be discussed below, such functionality also allows the memory system to update a seed value.

Figure 4:
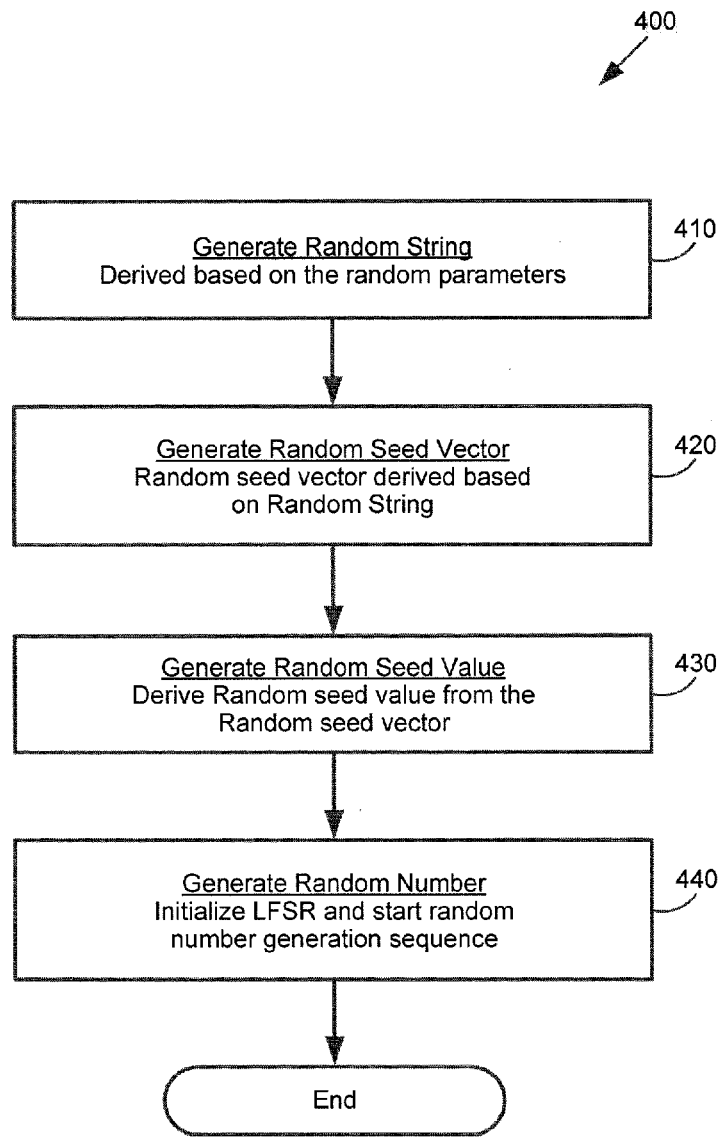
FIG. 4 is a flow chart of a method of an embodiment for generating a random number based on a unique random string.

The seed value can be generated from the random defect in any suitable way using any suitable algorithm or method for generated a seed value (e.g., using the controller 110, the seed value generation module 140, or some other component in the memory system 100). FIG. 4 shows a flow chart 400 with one suitable method for generating the seed value. (The same procedure can be used when there is a need for a new random seed with additional available random parameter(s).) As shown in FIG. 4, these steps include generating a random string based on the identified random defect (act 410), generating a random seed vector from the random string (act 420), and generating the random seed value from the random seed vector (act 430). After the random seed value is generated, the memory system 100 can then generate a random number based on the seed value (e.g., using a linear-feedback shift register (LFSR)) (act 440).

Figure 5:
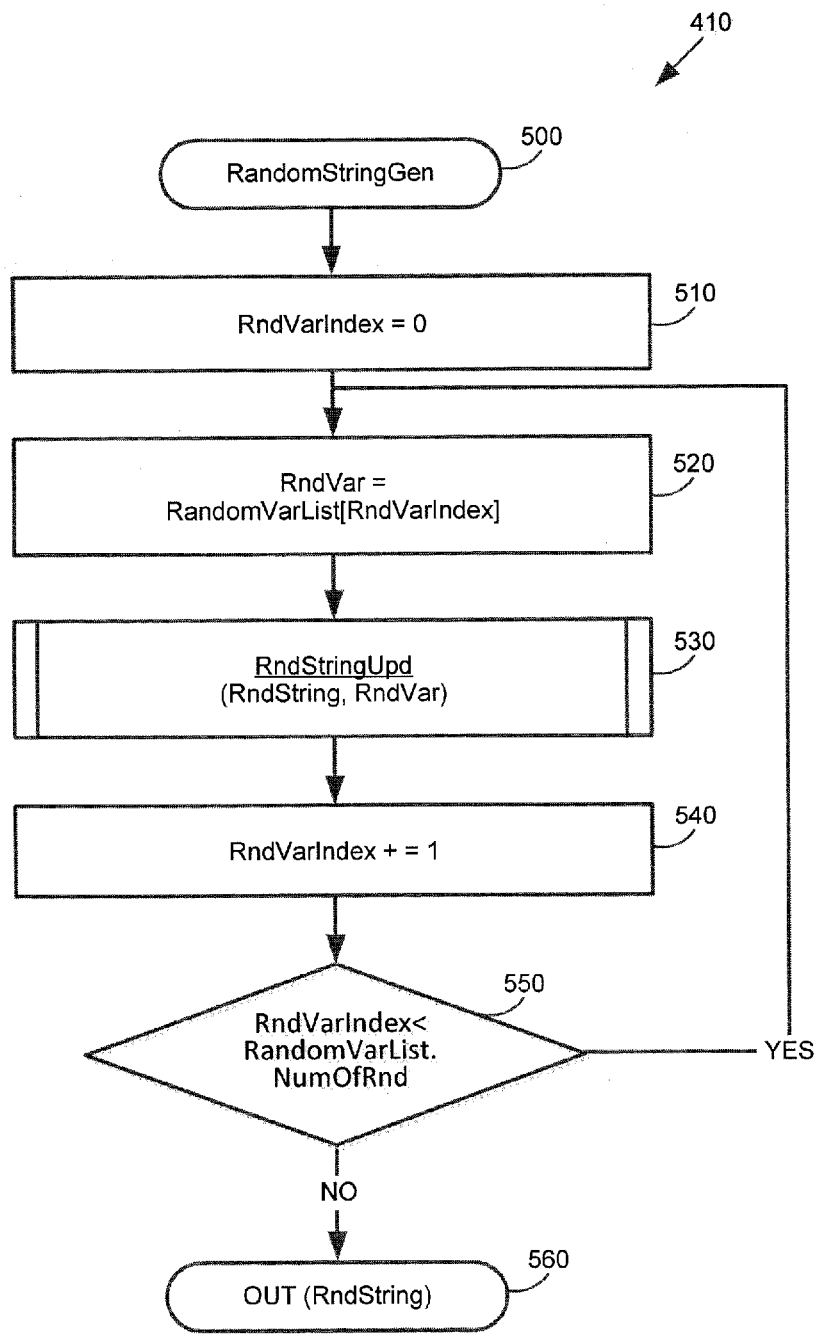
FIG. 5 is a flow chart of a method of an embodiment for generating a random string.
Figure 6:
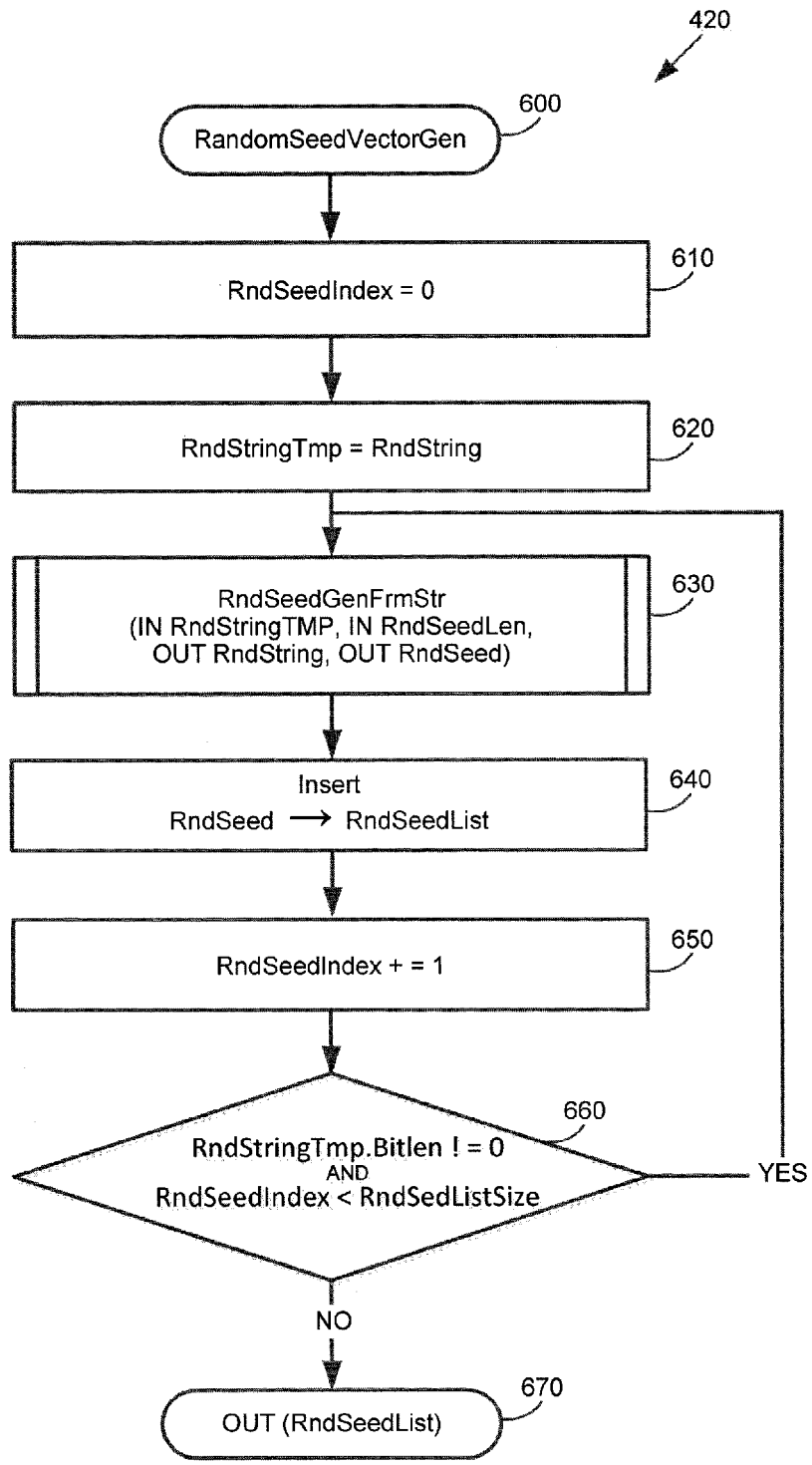
FIG. 6 is a flow chart of a method of an embodiment for generating a random seed vector.
Figure 7:
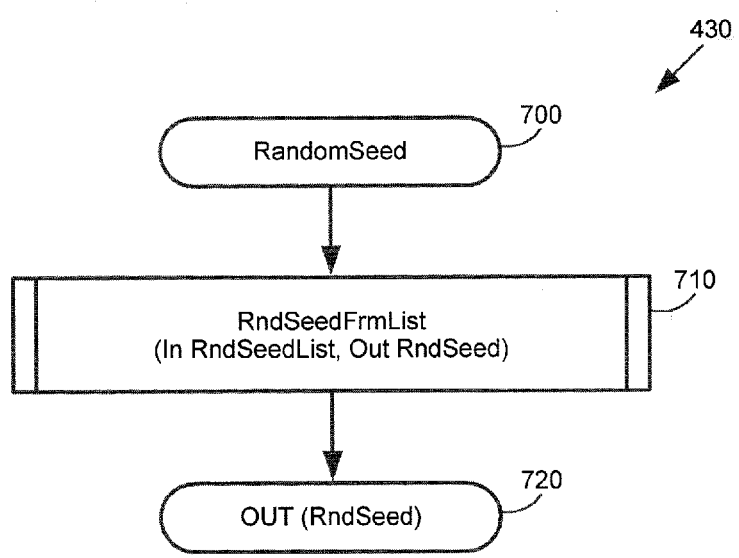
FIG. 7 is a flow chart of a method of an embodiment for generating a random seed vector.

FIGS. 5-7 illustrate acts 410-430 in more detail. With reference first to FIG. 5, to generate a random string (act 500), the input parameter can be RandomVarList={RandVar{Str,Bitlen}[N]; NumOfRnd, and the output parameter can be RndString={Str, Bitlen}={NULL, 0). The memory system 100 can set a random variable index (RndVarIndex) to 0 (act 510) and then set a random variable (RndVar) to be equal to the value of a random variable list function (RandomVarList) applied to the random variable index (RndVarIndex) (act 520). A random string update variable (RndStringUpd) is then generated from a random string (RndString) and a random variable (RndVar) (act 530).

It should be noted that this can be done using a generic function independent of the random variable, and that the function can take a random variable and update the RndString with new Random variable. A simple implementation of this is RndString.Str=Cat(RndString.Str, RndVar.Str) and RndString.Bitlen=RndString.BitLen+RndVar.Bitlen. It should be possible to implement any complex procedure to derive the random string based on the random variable Next, the random variable index (RndVarIndex) is increased by one (act 540), and the memory system 100 determines if the random variable index (RndVarIndex) is less than the RandomVarList.NumOdRnd (act 550). If it is, acts 520-540 are repeated. If it isn't, the output is the random string (act 560).

FIG. 6 shows the act of generating a random string vector (act 420) in more detail. To generate the random seed value (act 600), the input parameter can be RndString={Str, Bitlen}RndSeedLen_RndSeedListSize, and the output parameter can be RndSeedList={RndSeed[N], NumOfRndSeed}={NULL[N], 0} The random seed index (RndSeedIndex) is then set to 0 (act 610). Next, a temporary random string (RndStringTmp) is set to the random string (RndString) (act 620). A random seed generation function (RndSeedGenFrmStr) function is then started with inputs RndStringTemp and RndSeed Len and with outputs RndString and RndSeed (act 630). The function generates a random seed value of length RndSeedLen from a random string of a given length. The procedure to generate the seed value from a string of length can be generic. A safe approach can be to generate a seed value with weightage spread across all the bits of the string. The procedure can be generic to generate random seed of any length based on a variable length random string. Next, RndSeed is inserted into the RndSeedList (act 640), and the RndSeedIndex is increased by 1 (act 650). The memory system 100 then determines if RndStringTmp.Bitlen!=0 and if RndSeedIndex is less than RndSeedListSize (act 660). If they are, acts 630-650 are repeated. If they are not, the RndSeedList is outputted (act 670).

FIG. 7 shows the act of generating a random seed value (act 430) in more detail. To generate a random seed (act 700), the input parameter can be RndSeedList={RndSeed [N],NumOfRndSeed}, and the output parameter can be RndSeed. The random seed value derived can feed to LFSR based random generation logic, and the random seed thus generated from random NAND parameters can be ensured to be unique across all NAND devices. The random number thus generated from the unique seed ensure a unique random sequence across NAND devices.

A RndSeedFrmList function is used with the inputs RndSeedList and RndSeed (act 710). This function generates a random seed from the random seed vector list. A typical simple implementation can be to XOR all random seeds in the random seed vector list. A more complex procedure can also be derived. The output of this function is the random seed (RndSeed) (act 720).

It should be noted that, over prolong use of the memory die, the number of bad blocks can grow over time. The new bad blocks generated over time will again be random and can depend on various parameters, such as, but not limited to, usage pattern and number of reads and writes. It is highly unlikely that blocks grown bad over time across devices will be identical. In one embodiment, the memory system 100 is configured to regenerate the seed value during the lifetime of the memory die. In one embodiment, the grown bad blocks are added to the bad block lists, and a new updated bad block list can be used to generate a new random seed value which can be used to generate random number sequences different from the initial seed value, thus adding more randomness in the system. This embodiment will now be discussed in conjunction with FIG. 8. In general, the new update of random seed can be done with random parameters, which may not actually be a defect but are nevertheless inherently random. One example of such parameter is the read scrub queue (mentioned earlier). The new updated seed can be derived by adding additional parameters to the existing stored random parameter and defect list used to derive the random seed in the previous instance. It is also possible for a completely new random defect and random parameter to be considered, depending on their availability, and the same sequence of operations on the parameters can be executed to generate the random seed.

Figure 8:
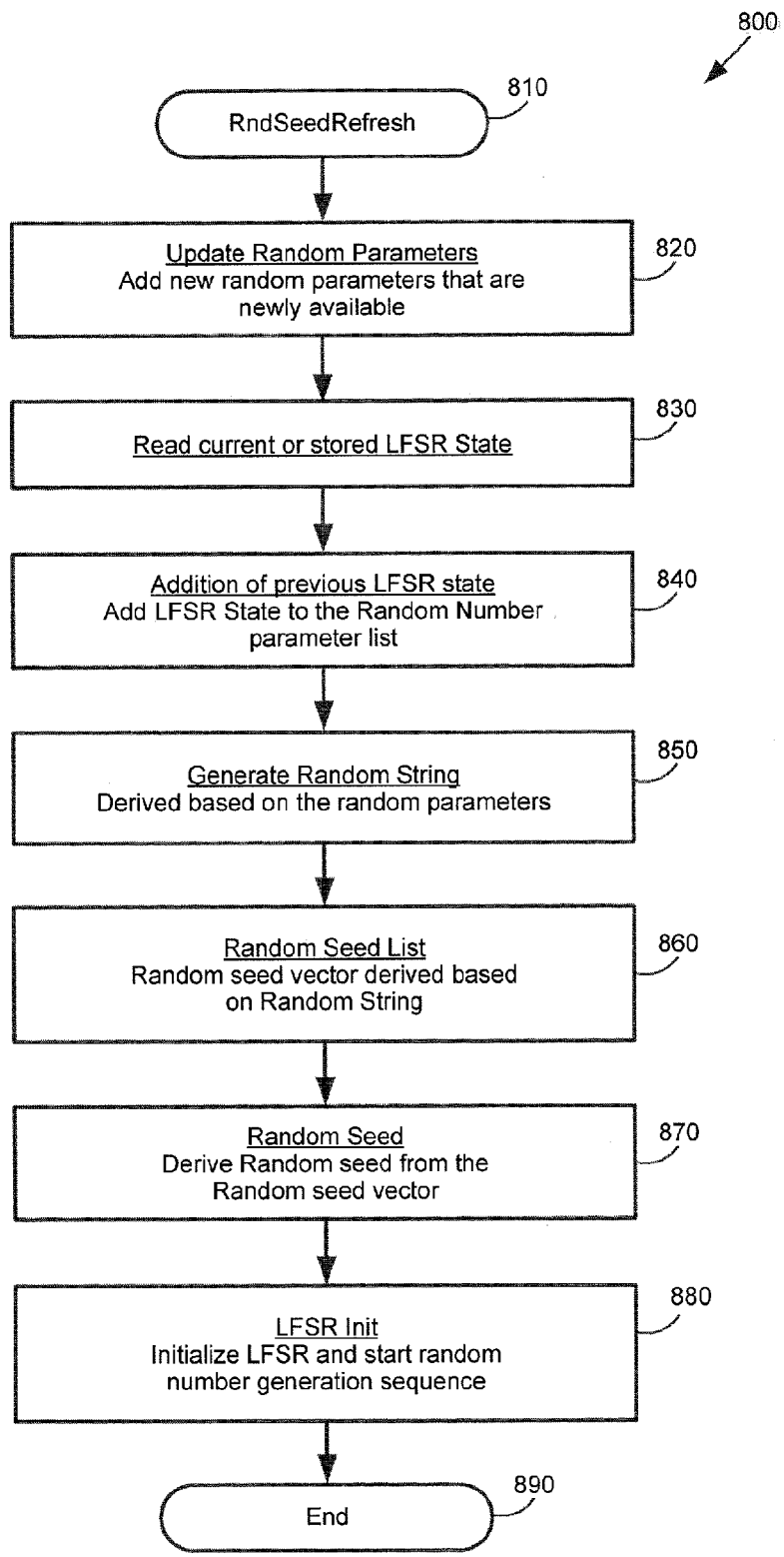
FIG. 8 is a flow chart of a method of an embodiment for generating a new seed value based on an identified additional random defect in a memory die or random parameters, such as read scrub.

Turning now to FIG. 8, FIG. 8 shows a flow chart 800 of a method of an embodiment for generating a new seed value based on an identified additional random defect in a memory die. The refreshing of the random seed (act 810) can be invoked on certain frequency during the lifetime and on power reset, for example. In this process, the memory system 100 updates the random parameters (act 820), which may include reading the current, stored, or previous state of the random number generator (e.g., the LFSR) (acts 830, 830, 840). Next, the memory system 100 generates a random string (act 850), a random seed list (act 860), a random seed (act 870). The random number is then generated (act 880) before the process ends (act 890).

There are several advantages associated with these embodiments. For example, these embodiments provide a very simple way for generating a seed value for the generation of random number and can be implemented in existing memory systems without additional hardware support. Generating a seed value on the inherent randomness of the defects in a memory die provides a highly non-repeatable value and, thus, can generate non-overlapping random sequences across numerous memory systems. This is especially beneficial for memory systems that use a seed value to generate a random number for secure communication with another device for data security and protection. For secure sharing of sensitive data between the memory system and another device, a strong encryption/decryption scheme is very important and can be achieved using the present embodiment to derive unique seed values across different memory systems with very low probability of repeatability. The seed value can be used to generate random number based on a simple LFSR base state machine implementation. A unique seed value to a LFSR is fundamental to guarantee non-overlapping random sequence across millions of devices.

The following is an example that illustrates the methods discussed above for deriving a seed value for a random number generator based on inherent characteristics of a memory die (a NAND die will be discussed below, but it should be understood that other memory technologies can be used). As mentioned above, a typical memory die can have some bad blocks that are the result of the manufacturing process. Typically, a NAND die will have 1K+NAND blocks for data storage. Out of all the available data blocks, some data blocks will be bad blocks. (In addition to bad blocks developed during production, over long use of good blocks in a typical memory die, the number of bad blocks can grow over time.) During the die sorting process, bad blocks location are programmed in the die before the die is used in a product. For example, bad blocks can be identified during product formatting and marked as not usable for the product lifetime. Die blocks can be numbered serially, and, hence, each bad block can be referred to with a unique index number. After die sort, a typical bad block list can contain the index number of the bad blocks. For example, in a die of 1k+ blocks, there may be approximately 8-10 bad blocks that occurred due to inherent statistical nature of the manufacturing process. Also, since the die manufacturing process is inherently probabilistic, it will be of extreme low probability that two manufactured die will have exactly same list of bad blocks. For example, with dies having 1,024 blocks and an average had block rate of 1%, each die will have an average bad block list size of 10. Hence, the probability of two dies having the same bad block list will be in the order of $1/(10^{30})$. Accordingly, it can be concluded that the probability of two dies having an identical bad block list is extremely low.

To extend this further, in any typical storage product, there may be more than one die. The dies are numbered in serial fashion (e.g., 0, 1, 2, etc.). Each bad block of die i is numbered as <i><bad block#>.

Assume there is N dies and die i has bi bad blocks, where 0<i<N

Hence, the complete bad block list of the entire product with N dies is {<0><B00>, . . . , <0><B0bo>, <0><B10>, <0><B1b1>, . . . , <N-1><B(N-1)0>, . . . , <0><B(N-1)b(n-1)>}. Since for each die, the bad block list is sufficiently random, the bad block list generated from all dies in a product device will be more unique and hence will have a much lower probability of repetition across product devices.

The description below describes the method of generation of initial seed value from the bad block list. The bit size of the Random seed value is S 1. Read the bad block list for all dies.
2. Generate a bad block list set for each die with the numbering scheme <die number><Bad block number>.

The bad Block set for a die i is {<i><Bi0>, <i><Bi1>, . . . , <i><Bibi>} where, bi is the number of bad block in the die and bi, and Bi0, Bi1, Bibi are the bad block numbers.

3. Number of bits required to represent the bad block number is M and number of bits required to represent die number is D. Hence, the total number of bits required to represent a unique bad block for a die is (M+D). Typical values for M and D are 11 and 2.

4. Arrange all the bad block number from all the bad block set of all dies in a linear manner to form a Bad Block String BS={<0><B00> . . . <0><B0b0>, <0><B10> . . . <0><B1b1><N-1><B(N-1)0> . . . <0><B(N-1)b(n-1)>}.

The bit length of the Bad Block string is BL=(M+D)×ΣBi: i→0 to N-1

The Bad Block String BS will be highly non-repeatable as derived from the heavily randomized bad block list of individual die due to inherent probabilistic nature of bad blocks.

5. Create a set of random seed values from the Bad block string. The number of seed values that can be created from the bad block string BS is X=Ceiling (BL/S). The set of seed value derived RS={R0, R1, . . . , R(x-1)}

Random Seed values are derived in an iterative manner:
FX(BSi, BLi)→[Ri, BS(i+1), BL(i+1)].
FX is a generic function.
BSi→Bad block string after ith iteration,
BLi→Bit size Bad block string after ith iteration,
The iterative steps are as follows:

```
{
   BS0 = BS
   BL0 = BL
   i = 0
   Loop: {
      FX(BSi, BLi) --> [Ri, BS(i+1) , BL(i+1) ]  // Output
      If (BL(i+1) = BitSize (BS(i+1) )) > N) { i++; continue
   Loop}
      else { R(i+1) = (BS(i+1) + padded bits); break }
   }
}
```

The resulting Seed value set is RS={R0, R1 . . . RX-1}

In the above algorithm, the function FX is used as generic function. The function operating on the bad block string output three values—Seed of bit size S, Bad block string of bit size BL-S, the bit length of the bad block string.

The following is an example of a function that can be used, although other functions are possible:

```
Fx(bs, bl) {
   b = bi/8;
   s = bs;
   i = 0;
   k = 0;
   while (i < S/8) {
      ri = s[k mod b]; // ri = i the byte of r
      s = s [REM_BYTE] k ; k = Ri ] // REM_BYTE --> Removal of the
   kth byte string from BS and right shifting the bytes from (k+1)
      b = b -1;
      i++
   }
   Return(r, s, b*8);
}
```

The concept of generating a seed value is not limited to the algorithm described above. Any suitable algorithm with adequate mechanism to generate unique seed values can be used.

6. Generate a unique seed value from the set of seed values derived in step 5:
seed=Fy (RS: {{R0, R1 . . . RX-1})

In the above algorithm, the function Fy is used as generic function, but these embodiments do not put a restriction on the choice of function FX. A typical algorithm of a function of choice can be:

```
Fy(RS) {
   seed = R0 [XOR] R1
   i = 2;
   while (i < X) {
      seed = Ri [XOR] seed;
      i++;
   }
   Return (seed);
}
```

The above steps describe the preparation of seed value for the generation of random number. In this example, the seed value is derived from list of bad blocks across the dies and will be unique across millions of devices as based on the inherent nature of the die.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for generating a seed value, the method comprising:
    performing the following in a memory system having a plurality of memory dies:
        identifying random defects in the plurality of memory dies; and
        in accordance with the identified random defects, generating a seed value by:
            generating a string listing the identified random defects and which memory dies they are located in;
            generating a random seed vector by inputting the string into a random function; and
            generating a random seed value from the random seed vector,
        wherein a random number can be generated with the random seed value.

2. The method of claim 1, wherein:
    the plurality of memory dies are configured to store information about the random defects in the plurality of memory dies; and
    the random defects in the plurality of memory dies are identified by reading the information from the plurality of memory dies.

3. The method of claim 1 further comprising generating the random number based on the random seed value.

4. The method of claim 3, wherein the random number is generated by a hardware random number generator in a controller in the memory system.

5. The method of claim 4, wherein the hardware random number generator comprises:
    a transducer to convert a physical phenomenon to an electrical signal;
    an amplifier to increase amplitude of the electrical signal; and
    an analog-to-digital converter to convert an amplified digital signal to a digital number.

6. The method of claim 3, wherein the random number is generated by a controller in the memory system executing computer-readable program code.

7. The method of claim 6, wherein the random number is generated using a software routine that uses a clock of the controller as an input.

8. The method of claim 1 further comprising:
    identifying an additional random defect in the plurality of memory dies; and
    generating a new seed value based on the identified additional random defect.

9. The method of claim 1, wherein the random defects are identified by one or more of the following: a bad block list, a bad bit location, a partial bad block list, a partial good block list, a grown bad block list, and a list of defective wordlines.

10. The method of claim 1, wherein at least one of the plurality of memory dies is a three-dimensional memory.

11. The method of claim 1, wherein the memory system is embedded in a host.

12. The method of claim 1, wherein the memory system is removably connected to a host.

13. A memory system comprising:
    a plurality of memory dies; and
    a controller in communication with the plurality of memory dies, wherein the controller is configured to:
        identify random inherent characteristics in the plurality of memory dies; and
        generate a seed value for generation of a random number based on the identified random inherent characteristics, wherein the controller is configured to generate the seed value by:
            generating a string listing the identified random inherent characteristics and which memory dies they are located in;
            generating a random seed vector by inputting the string into a random function; and
            generating a random seed value from the random seed vector.

14. The memory system of claim 13, wherein:
    the plurality of memory dies are configured to store information about the random inherent characteristics in the plurality of memory dies; and
    the controller is configured to identify the random inherent characteristics in the plurality of memory dies by reading the information from the plurality of memory dies.

15. The memory system of claim 13, wherein the controller is further configured to generate a random number based on the seed value.

16. The memory system of claim 15, wherein the controller is configured to generate the random number using a hardware random number generator in the controller.

17. The memory system of claim 15, wherein the controller is configured to generate the random number by executing computer-readable program code.

18. The memory system of claim 13, wherein the controller is further configured to:
    identify an additional random inherent characteristic in the plurality of memory dies; and
    generate a new seed value based the identified additional random inherent characteristic.

19. The memory system of claim 13, wherein the random inherent characteristics are identified by one or more of the following: a bad block list, a bad bit location, a partial bad block list, a partial good block list, a grown bad block list, a list of defective wordlines, a read scrub queue, memory trim parameters, and a state of a random number generator.

20. The memory system of claim 13, wherein at least one of the plurality of memory dies is a three-dimensional memory.

21. The memory system of claim 13, wherein the memory system is embedded in a host.

22. The memory system of claim 13, wherein the memory system is removably connected to a host.

23. A memory system comprising:
    a plurality of memory dies;
    means for identifying random defects in the plurality of memory dies;

means for generating a string listing the identified random defects and which memory dies they are located in;
means for generating a random seed vector by inputting the string into a random function; and
means for generating a random seed value from the random seed vector, wherein a random number can be generated with the random seed value.

24. The memory system of claim 23 further comprising means for generating the random number based on the random seed value.

25. The memory system of claim 23, wherein the random defects are identified by one or more of the following: a bad block list, a bad bit location, a partial bad block list, a partial good block list, a grown bad block list, and a list of defective wordlines.

26. The memory system of claim 23, wherein at least one of the plurality of memory dies is a three-dimensional memory.

27. The memory system of claim 23, wherein the memory system is embedded in a host.

28. The memory system of claim 23, wherein the memory system is removably connected to a host.

29. The memory system of claim 23 further comprising means for generating a random seed over a life time of the memory system based on a random string comprising an initial defect in the memory system, a new added random defect, and a random parameter.

30. The memory system of claim 29, wherein the added random defect comprises one or more of the following: a grown bad block, a grown partial bad block, and a grown partial good block.

31. The memory system of claim 29, wherein the random parameter comprises one or more of the following: a read scrub queue entry, a linear-feedback shift register (LFSR) state, and a trimming parameter.

* * * * *